United States Patent
Jones

(10) Patent No.: US 6,274,263 B1
(45) Date of Patent: *Aug. 14, 2001

(54) SEMI-FLOODED LEAD ACID BATTERY CELL

(76) Inventor: William E. M. Jones, P.O. Box F42533, Waters Edge, Ocean Hill Boulevard, Freeport (BS)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/188,025

(22) Filed: Nov. 6, 1998

Related U.S. Application Data

(63) Continuation-in-part of application No. 09/022,336, filed on Feb. 11, 1998, which is a continuation-in-part of application No. PCT/US97/20445, filed on Nov. 12, 1997, and a continuation-in-part of application No. 08/738,160, filed on Oct. 25, 1996, now abandoned.
(60) Provisional application No. 60/030,854, filed on Nov. 12, 1996, and provisional application No. 60/005,940, filed on Oct. 25, 1995.

(51) Int. Cl.$^7$ ........................................... H01M 2/12
(52) U.S. Cl. .................. 429/53; 429/54; 429/56; 429/57; 429/82; 429/87; 429/204; 429/228
(58) Field of Search ...................... 429/53, 54, 56, 429/57, 82, 87, 204, 228

(56) References Cited

U.S. PATENT DOCUMENTS

| | | | |
|---|---|---|---|
| 2,934,580 | 4/1960 | Neumann | 136/6 |
| 3,494,800 | 2/1970 | Schoeld | 136/176 |
| 3,846,175 | 11/1974 | Desai | 136/14 |
| 3,904,434 | 9/1975 | Sekido et al. | 136/26 |

(List continued on next page.)

FOREIGN PATENT DOCUMENTS

| | | |
|---|---|---|
| 407845 | 11/1970 | (AU) . |
| 29 04 842 | 8/1980 | (DE) . |
| 871605 | 6/1961 | (GB) . |
| WO 97/15958 | 5/1997 | (WO) . |

OTHER PUBLICATIONS

"Maintenance–Free Batteries Lead–Acid, Nickel/Cadmium, Nickle.Metal Hydride, A Handbook of Battery Tehcnology", Published by Research Studies Press, 1993, pp. 131–133 and 180–183, No month available.

Journal of Power Sources "Technical trends in industrial lead/acid batteries in Japan" 48(1994) Feb. 19,, Nos. 1/2. Laausanne, CH pp. 55–67.

"Maintenance–Free Batteries Lead–Acid, Nickel/Cadmium, Nickel/Metal Hydride, A Handbook ofBattery Technology" 1st Ed., published by Research Studies Press, 1993, pp. 1–6, 128–170, 227–241, 244, No month available.

"Maintenance–Free Batteries Lead–Acid, Nickel/Cadmium, Nickel./Metal Hydride, A Handbook of Battery Technology" 2nd Ed., published by Research Studies Press, 1997, pp. 394–397, No month available.

Journal of Power Sources, 42 (1993) 89–101 "On the hydrogen balance in sealed lead/aci batteries and its effect on battery performance" H. Dietz, M. Radwan, H. Doring and K. Wiesener pp. 89–101, No month available.

*Primary Examiner*—Bruce F. Bell
(74) *Attorney, Agent, or Firm*—Synnestvedt & Lechner LLP

(57) ABSTRACT

A lead acid storage battery cell having a sealed housing in which a positive electrode and a negative electrode are immersed in a liquid electrolyte. The negative electrode is partially exposed to a gas space within the battery cell housing. A pressure relief valve allows excess gas to escape the battery cell while preventing air from outside the cell from entering the gas space. Exposing a section of the negative plate to oxygen gas that evolves within the battery and collects in the gas space reduces water consumption of the cell and extends the maintenance-free life of the battery. The addition of a catalyst to recombine oxygen and hydrogen offers further improvement.

23 Claims, 9 Drawing Sheets

U.S. PATENT DOCUMENTS

| | | | |
|---|---|---|---|
| 3,929,422 | 12/1975 | Kreidl et al. | 23/288 |
| 3,930,890 | 1/1976 | Dietz | 136/179 |
| 3,940,348 | 2/1976 | Lahme et al. | 252/466 |
| 3,976,510 | 8/1976 | Winsel et al. | 136/181 |
| 4,002,496 | 1/1977 | Nitta et al. | 429/53 |
| 4,074,024 | 2/1978 | Reber | 429/86 |
| 4,078,893 | 3/1978 | Gilman et al. | 23/253 |
| 4,098,964 | 7/1978 | Reber | 429/86 |
| 4,113,924 | 9/1978 | Kantner | 429/50 |
| 4,129,687 | 12/1978 | Lahme et al. | 429/86 |
| 4,180,624 | 12/1979 | Winsel | 429/54 |
| 4,349,614 | 9/1982 | Werth | 429/50 |
| 4,373,015 * | 2/1983 | Peters et al. | 429/204 |
| 4,400,450 | 8/1983 | Wagner | 429/86 |
| 4,414,295 | 11/1983 | Uba | 429/59 |
| 4,415,638 | 11/1983 | Meighan et al. | 429/225 |
| 4,436,795 | 3/1984 | Cooper et al. | 429/53 |
| 4,584,248 | 4/1986 | Iwata | 429/54 |
| 4,587,181 | 5/1986 | Gibson et al. | 429/59 |
| 4,810,598 | 3/1989 | Levy et al. | 429/59 |
| 4,876,495 | 10/1989 | Palanisamy et al. | 320/18 |
| 4,925,746 | 5/1990 | Pavlov et al. | 429/57 |
| 5,059,495 | 10/1991 | Burmistrov et al. | 429/57 |
| 5,114,806 | 5/1992 | Chiacchio et al. | 429/126 |
| 5,132,175 | 7/1992 | Mrotek et al. | 429/86 |
| 5,132,176 | 7/1992 | Valentine et al. | 429/91 |
| 5,304,433 * | 4/1994 | Cherng | 429/228 |
| 5,506,067 | 4/1996 | Tinker | 429/27 |
| 5,558,960 * | 9/1996 | Mitchell | 429/204 |

* cited by examiner

SEMI-FLOODED LEAD ACID BATTERY CELL

This application is a continuation-in-part of U.S. application Ser. No. 08/738,160 filed Oct. 25, 1996 now abandoned which claims the benefit of U.S. Provisional Patent Application No. 60/005,940 filed Oct. 27, 1995 [, and a continuation-in-part of U.S. application Ser. No. 09/022,336 filed Feb. 11, 1998 which a continuation-in-part of PCT application No. PCT/US97/20445 filed Nov. 12, 1997 which the claims the benefit to U.S. Provisional Application No. 60/030,854, filed Nov. 12, 1996]. U.S. application Ser. Nos. 08/738,160 [and 09/022,336 are] is hereby incorporated by reference.

BACKGROUND OF THE INVENTION

1. Field of the Invention

This invention relates to improvements in lead acid storage battery cells with regard to reduced water consumption and improved operating life. More specifically, it relates to the design of a simple and reliable sealed or valve regulated (VR) battery cell that has benefits not available in existing designs. The invention will be described in terms of the lead-acid variety used in stationary applications, but may be equally applied to other applications.

2. Description of Related Art a. Traditional Flooded Cells

The traditional flooded cell as illustrated schematically in FIG. 1 has at least two electrodes formed as plates containing electrode-active materials. The plates are completely immersed in an electrolyte solution, i.e. the active area of each plate which contains the active material is completely immersed. The typical lead-acid battery cell has a sulfuric acid electrolyte solution, a positive electrode containing an active material of $PbO_2$ and a negative electrode containing an active material of Pb. Customarily, the terms "anode" and "cathode" are employed to refer to the functions of the respective electrodes during cell discharge. A rigid but porous separator between the plates prevents any electrical contact between them. The positive and negative plates are electrically connected to respective positive and negative terminals positioned outside the cell for connection to an electric circuit.

A typical application for such a battery is standby power for computers or telephone systems. Here, the cells are placed on racks, connected in series, and charged or "floated" continuously at a controlled voltage.

This continuous charging has the effect of consuming water by electrolysis; that is, water is broken down into oxygen gas ($O_2$) at the positive plate and hydrogen gas ($H_2$) at the negative plate. These gasses rise to the surface of the electrolyte as bubbles and escape through a vent hole in the top of the cell.

The water consumption of flooded cells has been reduced to a minimum by charging the cells at the lowest possible voltage, but the cells still require water additions from time to time. Large stationary batteries, for example, may need watering every year in some applications which, in remote sites and with ever increasing labor costs, is expensive for the owner of the batteries.

It is, therefore, a commercial benefit to have batteries that do not require water additions, and there has been a great effort expended by the battery industry, particularly in the last decade, to develop sealed "valve regulated" (VR) cells. These VR cells use a different technology to reduce water consumption.

b. Valve Regulated Batteries

The conventional valve regulated lead acid cell (VRLA) of the conventional Absorbent Glass Mats (AGM) type, as illustrated schematically in FIG. 2, has the same kind of plates that flooded cell contains. However, instead of being submerged in a bath of electrolyte, these plates are sandwiched between absorbent sponge-like separators made from fine glass fibers. Virtually all of the electrolyte is absorbed in the sponge-like separators and there is essentially no "free" electrolyte in the cell. The VRLA cell also has a pressure relief valve, in place of the normal vent, that permits escape of pressurized gas but does not allow oxygen from the air to enter the cell.

The conventional VRLA cell has two advantages over the flooded cell. The first advantage is an immobilized electrolyte. The electrolyte being absorbed in the sponge-like separators, cannot leak out of the cell—even if the container is punctured or the cell is inverted. This advantage is very important in some battery applications (e.g. toys) but much less important in others (e.g. stationary standby power systems).

The second advantage is reduced water consumption. The aim of the VRLA design is to allow oxygen produced at the positive plate during charging to recombine with hydrogen ions and electrons on the negative plate, thereby reducing water loss. The absorbent sponge-like separator in the VR cell is deliberately designed to be less than 100% saturated, typically 95% saturated, leaving gas-permeable channels between the plates. This feature allows a process called the "oxygen cycle" (described below) to be established, which reduces the water consumption of the cell very significantly and allows the cell, at least in theory, to survive its entire design life without any water addition.

For most industrial users, this second advantage is the more important of the two because it reduces maintenance costs which, over a 20 year life of a battery, can be very substantial.

An alternative VRLA cell to the AGM cell is the gel cell. Here the electrolyte, instead of being absorbed in a glass mat separator, is mixed in the form of a gel. This gel is believed to crack in time and allow oxygen to pass through for recombination to take place in the same was an AGM cell.

c. Oxygen Cycle

FIG. 2 also shows, schematically, a valve regulated (VR) cell on charge. The oxygen gas produced on the positive plate, instead of bubbling to the surface of the electrolyte as in a flooded cell, penetrates the separator and comes into direct contact with the negative plate. This oxygen gas "depolarizes" the negative plate and recombines with the hydrogen ions generated there to form water, so that a minimum of hydrogen gas is produced. Thus the cell has a reduced water consumption.

d. Problems With VRLA Cells

VR cells of the lead-acid variety have been commercially successful and widely used in large stationary applications in the past few years. Their performance when new is usually excellent. However, as the cells age, their characteristics change for the worse and there are now many reports of field failures after only 4 or 5 years of service for cells designed for 20 years of life.

Extensive tests by my company of VR cells of different manufacturers confirm that serious variations exist in cell performance and behavior. It is the inventor's belief that the principal reason for the problems of the conventional VR cell is related to the sponge-like glass mat separators; as the cell ages, these separators become drier and drier, allowing more and more oxygen to penetrate the separators and reach the negative plate. Eventually, the rate of oxygen "transport" becomes too great and the negative plate becomes discharged.

In other words, while a small amount of oxygen transport is good and necessary for the oxygen cycle to function, too much is detrimental to the cell. The negative plate, in a sense, needs protection from "attack" by the oxygen in order to survive. However, this model of cell behavior is not yet well understood by the industry.

Berndt, *Maintenance Free Batteries* P.238, (John Wiley and Sons, New York 1997)discloses that an increased rate of oxygen reduction is observed in vented, flooded lead-acid batteries that have lost so much water that their connecting elements or even parts of the electrodes are no longer immersed in the electrolyte and can easily by reached by the oxygen gas. However, according to Berndt, efficient oxygen cycling to prevent the loss of electrolyte in lead-acid batteries requires immobilization of the electrolyte, and even then, the 100% efficiency attained by alkaline cells like the cell disclosed by U.S. Pat. No. 4,436,795 is not achieved. There remains a need for lead-acid batteries with improved oxygen cycling efficiency.

Accordingly, one object of the present invention is to provide a lead acid storage battery that minimizes water consumption while protecting the negative electrode from excess oxygen.

Another object of the present invention is to provide a storage battery with improved reliability.

A further object is to provide a storage battery that requires less maintenance.

Another object is to provide a storage battery that will last longer.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations pointed out in the appended claims.

SUMMARY OF THE INVENTION

Broadly, the objects and advantages of the present invention are attained by an electric battery having a sealed housing in which a positive electrode containing $PbO_2$ as the active material and a negative electrode containing lead as the active material are in contact with a free, liquid electrolyte containing sulfuric acid. Gas including oxygen produced within the battery collects in a gas space in the battery.

The negative electrode is positioned with its active material is partially exposed to the gaseous oxygen in the gas space. A pressure relief valve is positioned in the battery to allow excess gas to escape the housing, but which prevents air from outside the housing from entering therein.

In this manner water consumption is minimized and the maintenance-free life of the battery extended.

Further improvement is obtained by including a catalyst for recombining hydrogen and oxygen to water. The catalyst is positioned to be in communication with the gas in the gas space.

BRIEF DESCRIPTION OF THE DRAWINGS

The accompanying drawings, which are incorporated in and constitute a part of the specification, illustrate presently preferred embodiments of the invention. Together with the general description given above and the detailed description of the preferred embodiments given below, they serve to explain the principles of the invention.

DETAILED DESCRIPTION

The invention will now be explained by way of an embodiment in the form of a "semi-flooded" cell. This cell combines some of the features of the traditional flooded cell with the oxygen cycle used on the conventional VR cell.

Figure 3:
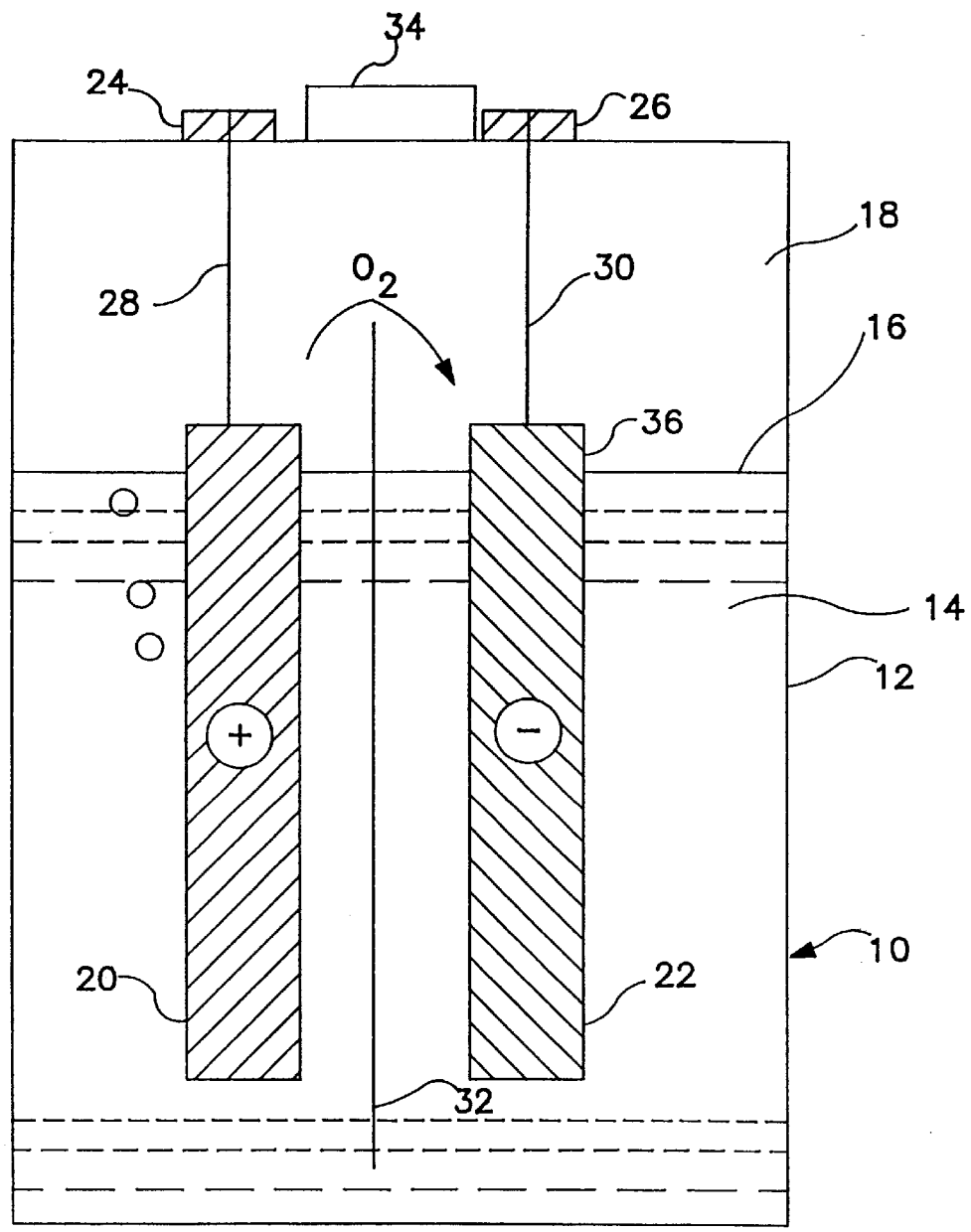
FIG. 3 is a schematic view of a battery cell made in accordance with the present invention.

FIG. 3 illustrates such a semi-flooded cell of the lead acid type in its simplest form. The semi-flooded cell 10 has a sealed housing 12 which is gas-tight as is known and used in the art.

Within the housing 12 is a liquid electrolyte 14 having a liquid level 16. "Liquid electrolyte" as used herein refers to non-immobilized electrolyte, or free electrolyte as typically used in conventional flooded cells. A gas space 18 defined by the liquid level 16 and the upper inside walls of housing 12 collect gas which floats up from the electrolyte 14.

A positive electrode 20 having $PbO_2$ active material supported and immersed within the electrolyte 14 is shown. The positive electrode 20 may be formed as a plate as typical in the art. A negative electrode 22 having Pb active material is also supported and immersed within the electrolyte 14 as shown. The negative electrode 22 is likewise formed as a plate. Here, unlike the typical lead acid cell, the electrodes 20, 22 are not completely immersed in the electrolyte as further discussed below. Electrodes used in the type of batteries described herein are commonly formed as plates and thus commonly referred to in the art as plates. Thus, electrode and plate may be used interchangeably in this description, but it being understood that the present invention is not limited to electrodes formed as plates.

The positive and negative plates 20 and 22 are electrically connected to positive and negative terminals. 24 and 26 respectively by straps 28 and 30 as they are commonly referred to in the art. A conventional rigid but porous separator 32 is provided to prevent electrical contact between the positive and negative plates 20, 22.

As illustrated, the liquid level 16 of the electrolyte 14 is set slightly below the tops of the plates 20, 22 to expose a portion of the active material of the plates to the oxygen in the gas space; the negative plate 22 shown having a plate section 36 exposed to the oxygen in the gas space 18. That is, the the plates are by design partially exposed to the gas space 18 above the electrolyte 14.

Figure 1:
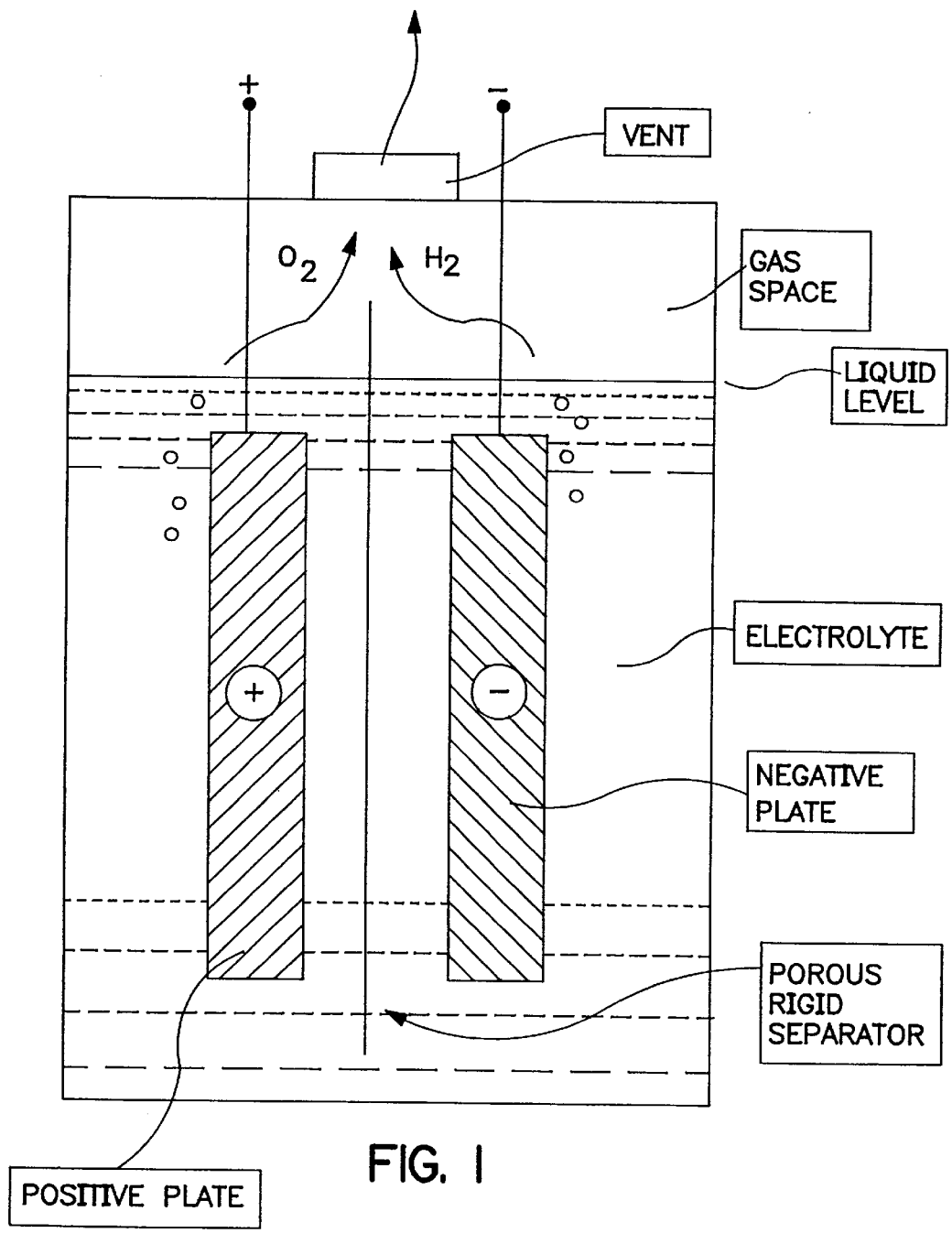
FIG. 1 is a schematic view of a conventional flooded cell battery.

Normally, on a conventional flooded cell as illustrated in FIG. 1, if the plates are exposed above the electrolyte, the oxygen from the air will enter the cell through the vent cap, oxidize the exposed portions of the negative plates, causing them to discharge. Furthermore, oxygen that is produced on overcharge is permitted to escape. This creates an imbalance that results in the generation of hydrogen gas, which escapes as well, with the net result being a loss of electrolyte liquid. This is why on most flooded cells a minimum level line is printed on the side of the container below which the electrolyte is not permitted to drop.

In this invention as illustrated in FIG. 3, however, a one-way pressure relief valve 34 is provided, as in a conventional VR cell, to prevent oxygen from entering from outside the cell and to allow excess gas to escape the cell rather than over-pressurizing the cell. During charge, the oxygen cycle takes place in the semi-flooded cell just as it does in the conventional VR cell but the exposed part of the negative plate predominantly takes part in the reaction and the oxygen cycle proceeds primarily above the electrolyte surface, not through the separators as in the case of the conventional VR cell. The obvious benefit is that the greater part of each negative plate is immersed in electrolyte and protected against the oxygen in the cell's atmosphere. In addition, by not immobilizing the electrolyte, the oxygen generated at the positive plate on overcharge that would ordinarily migrate through the openings that develop in immobilized electrolytes is cycled instead, and does not depolarize the negative plate.

Figure 4:
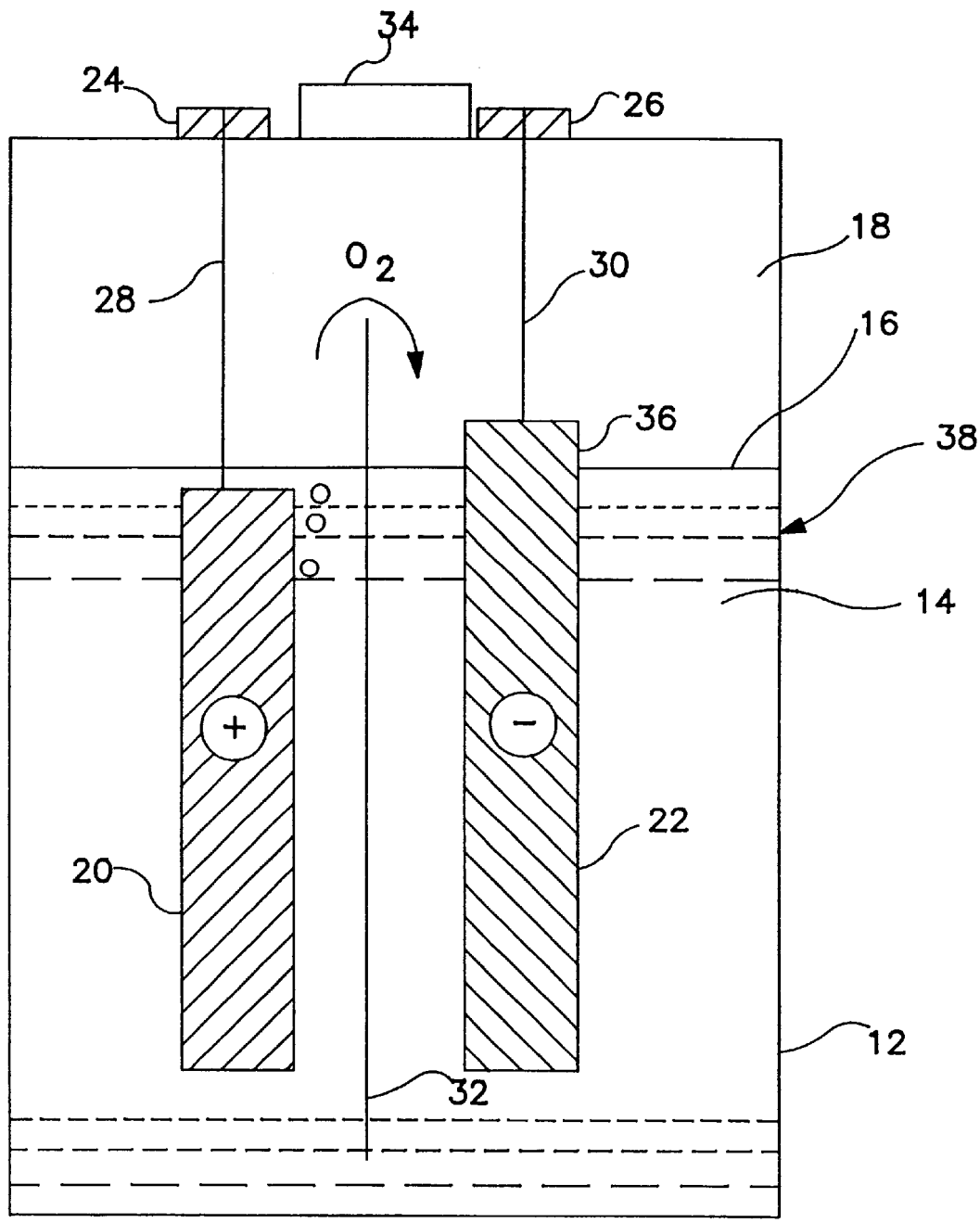
FIG. 4 is a schematic view of another battery cell (a second embodiment) made in accordance with the present invention showing the positive plate fully immersed in electrolyte.

FIG. 4 illustrates a modification of the design. The cell 38 is similar to cell 10 shown in FIG. 3 with similar elements identified with the same reference numbers. Here, the positive plate 20 is completely submerged in the electrolyte 14. Since the exposed part of the positive plate does not take part in the oxygen cycle reaction, the positive electrode 20 may be submerged at all times if so preferred.

Figure 5:
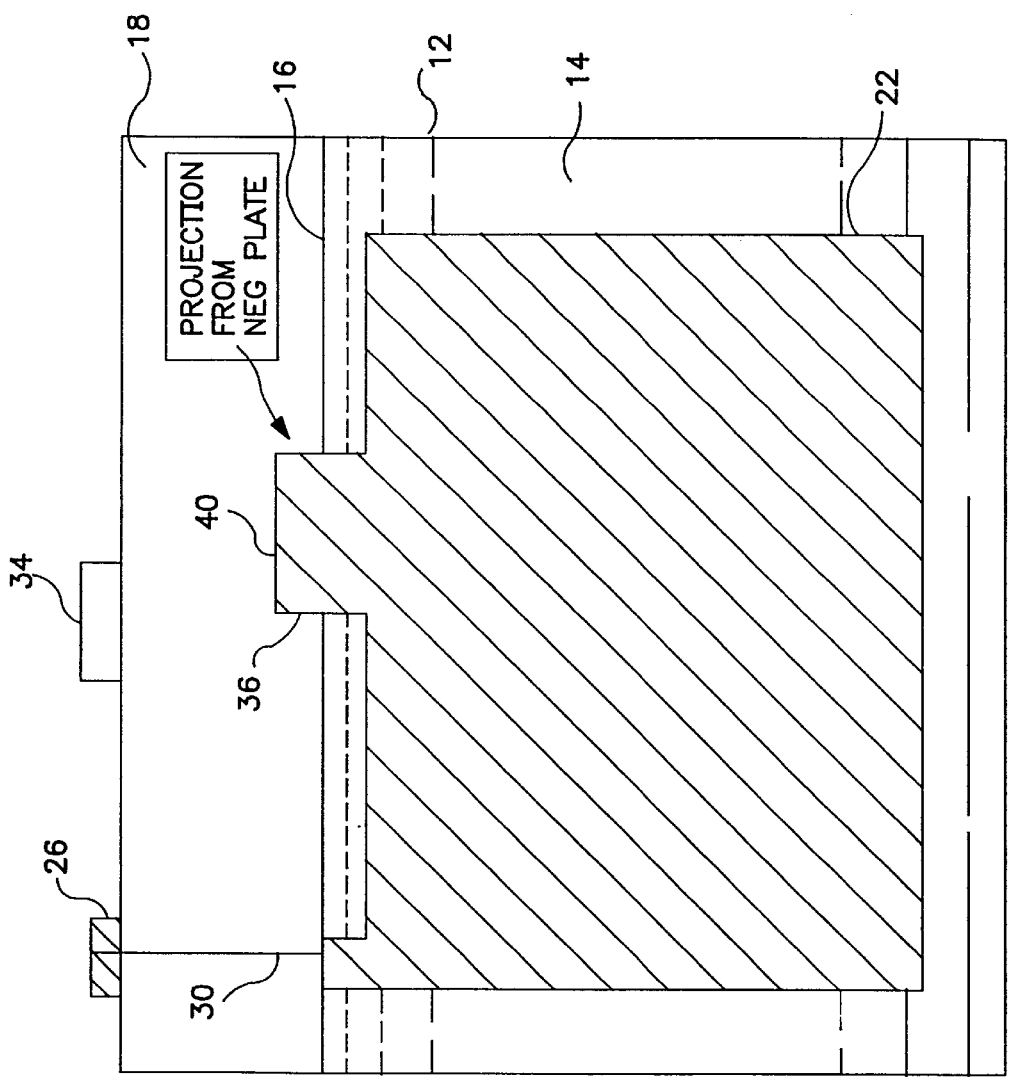
FIG. 5 is a schematic view of a third embodiment made in accordance with the present invention.

Referring to FIG. 5 another modification to the basic design is to shape the negative plate 22 so that the plate section 36 exposed to the oxygen is a projection 40 that projects above the electrolyte level. This allows easier control of electrolyte levels, especially on cells laid on their sides or having short, wide plates. If the projection is placed in the center portion of the plate, the effect of non-level installation will also be minimized. It is understood that the plate section 36 exposed to oxygen is not limited to the specific examples shown, and can include independent mini plates partially immersed in the electrolyte 14 and partially exposed to the oxygen above the liquid level 16. Such a mini plate would be electrically connected to the negative plate.

Figure 6:
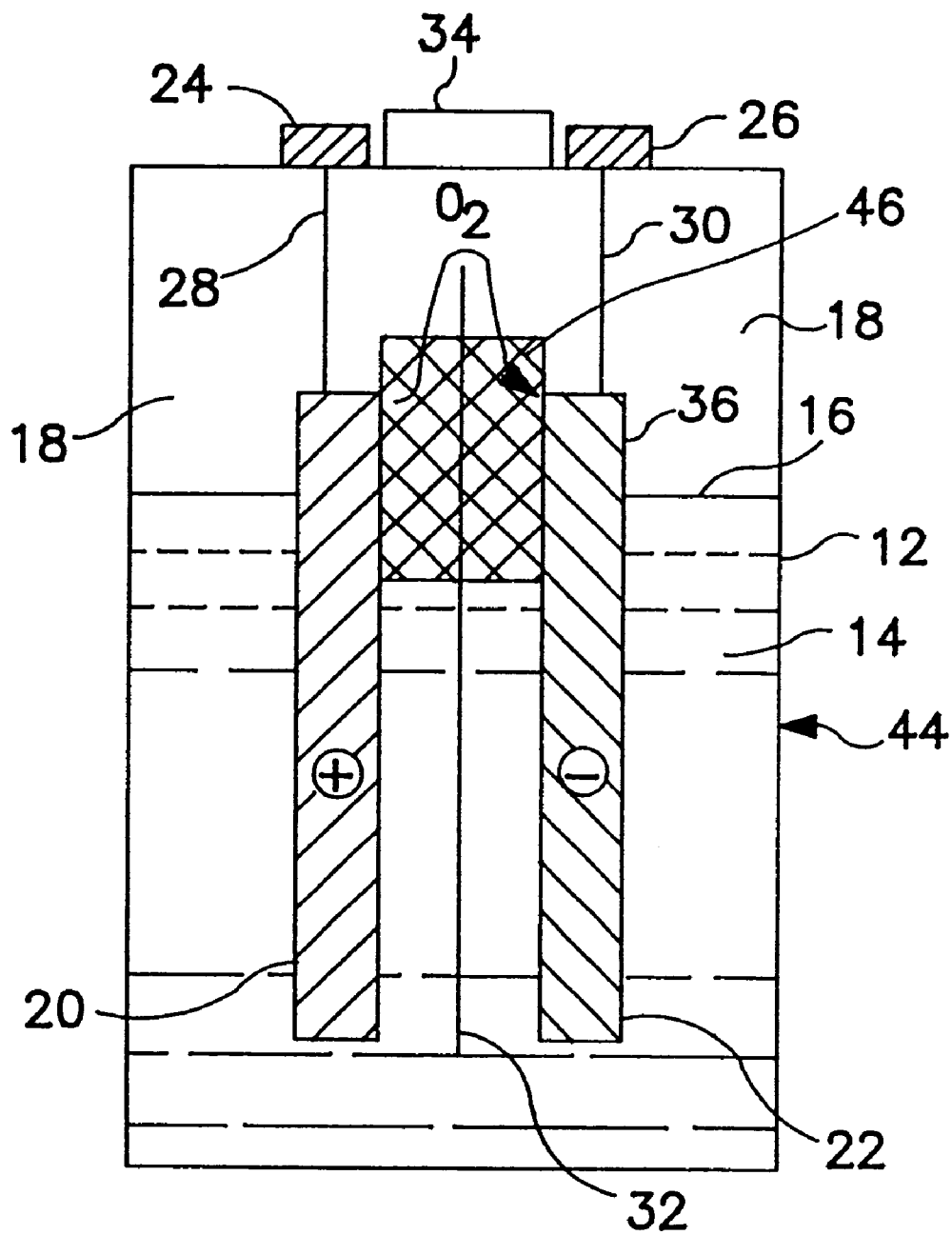
FIG. 6 is a schematic view of another embodiment of the present invention having a sponge-like separator between the positive and negative plates.

Illustrated in FIG. 6 is another embodiment of the invention which uses sponge-like separators in the semi-flooded design. For a higher charging current, usually used for shorter charge times, a larger amount of negative surface area may be exposed. In this later case, the ionic path may be too long to keep the electrodes charging and discharging uniformly. To counter this, a sponge-like separator may be used in addition, or instead of, the conventional separator in a like manner to a conventional VR cell having glass mats.

Referring to FIG. 6, the semi-flooded battery cell 44 is constructed similarly to the cell of FIG. 3 with the addition of a sponge-like separator 46 between the positive and negative plates partially immersed in the electrolyte 14 and partially exposed above the liquid level 16 of the electrolyte 14 as shown.

Figure 2:
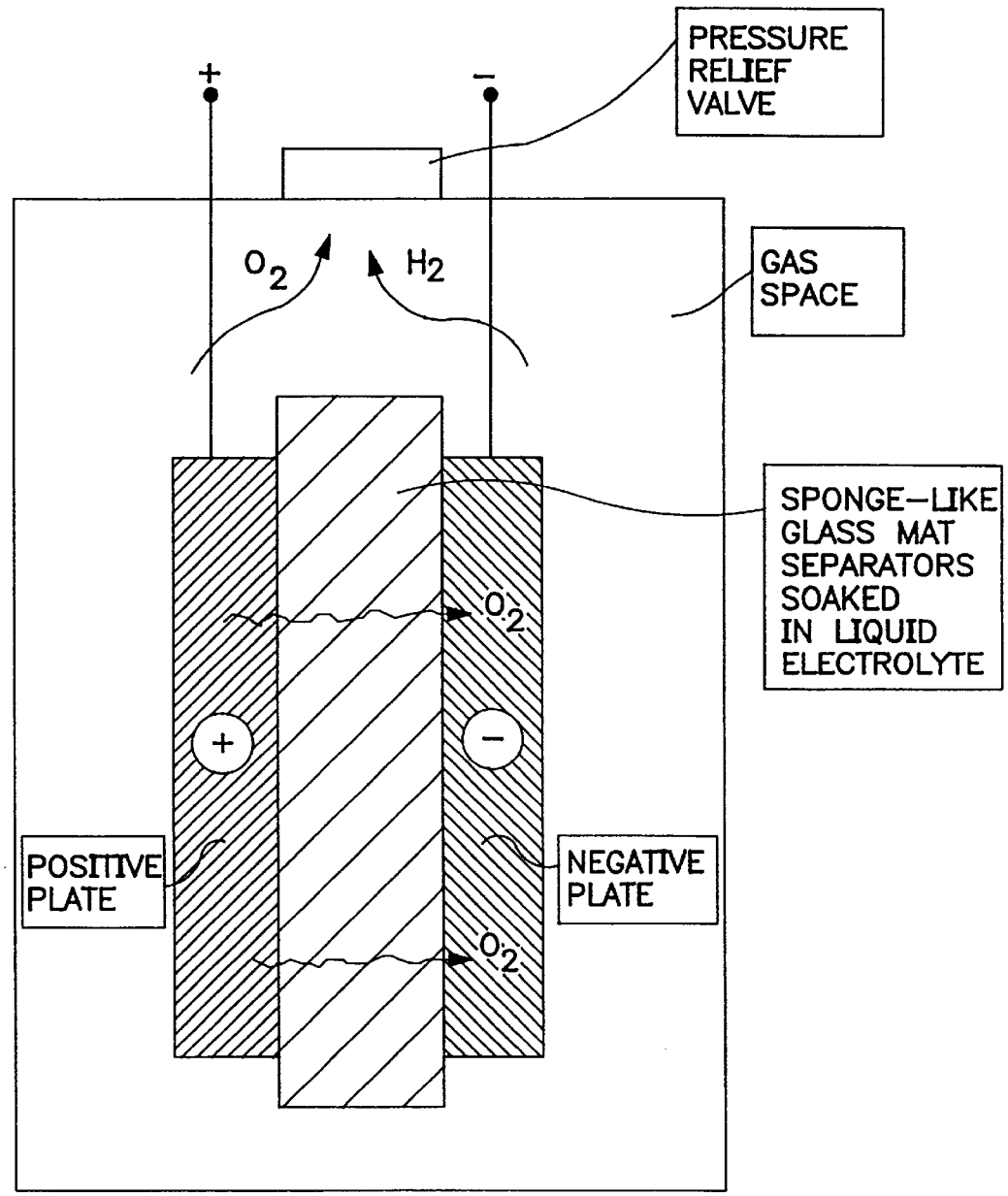
FIG. 2 is a schematic view of a conventional valve regulated cell.

Suitable material for the sponge-like separator 46 preferably includes course glass fibers of 10 microns or more as well as other materials having suitable properties. The glass mats here need not be selected to have very strong wicking characteristics as required by VR cells (and which typically use glass separator mats made from very fine glass fibers), but rather relatively weak wicking characteristics. To illustrate, the conventional VR cell as shown in FIG. 2 has no definable electrolyte level because the sponge-like separator acts like blotting paper and distributes the electrolyte level throughout the cell. There is no free electrolyte in the cell housing and no electrolyte will emerge even if the cell is inverted.

In the present embodiment, by contrast, there is a well defined acid level. The intent of this "weak wick" is to draw the electrolyte up a few centimeters to provide an additional ionic path between the plates. A simple parallel would be a wick in an oil lamp which emerges from the liquid with a defined level. If an oil lamp were built like a conventional VR cell, all the oil would be contained in the wick.

Immobilization of the electrolyte is not desired in this case as it is with a conventional VR cell. The cell of this invention, if punctured, would spill electrolyte just like a flooded cell. The aim here is to create a recombinant cell which retains the very real benefits of fully mobile electrolyte including better ionic contact with the plates, better heat transfer and the other benefits described later. The extra sponge-like separators in this variation merely help provide an ionic path between the plates above the normal electrolyte level for larger than normal plate exposures. Strong wick materials as used in VR cells may be used in addition to the weak wick materials as long as the saturation level is reduced or oxygen access to the plate through the material is provided such as with holes through the material.

In technical terms, while the conventional VR cell requires a saturation level of the separators of about 90% to 95%, and will not function at a saturation level much below this, I would seek a saturation level of between 20% and 70% with a preferred saturation of about 40%. The aim is a sponge-like separator that is as open as possible to oxygen transport between the plates. For example, a separator with holes perforated in it would suffice. In the cell of this invention, it is the degree of exposure above the defined electrolyte level that controls the extent of the oxygen cycle, not the average degree of saturation of the separators.

Figure 7:
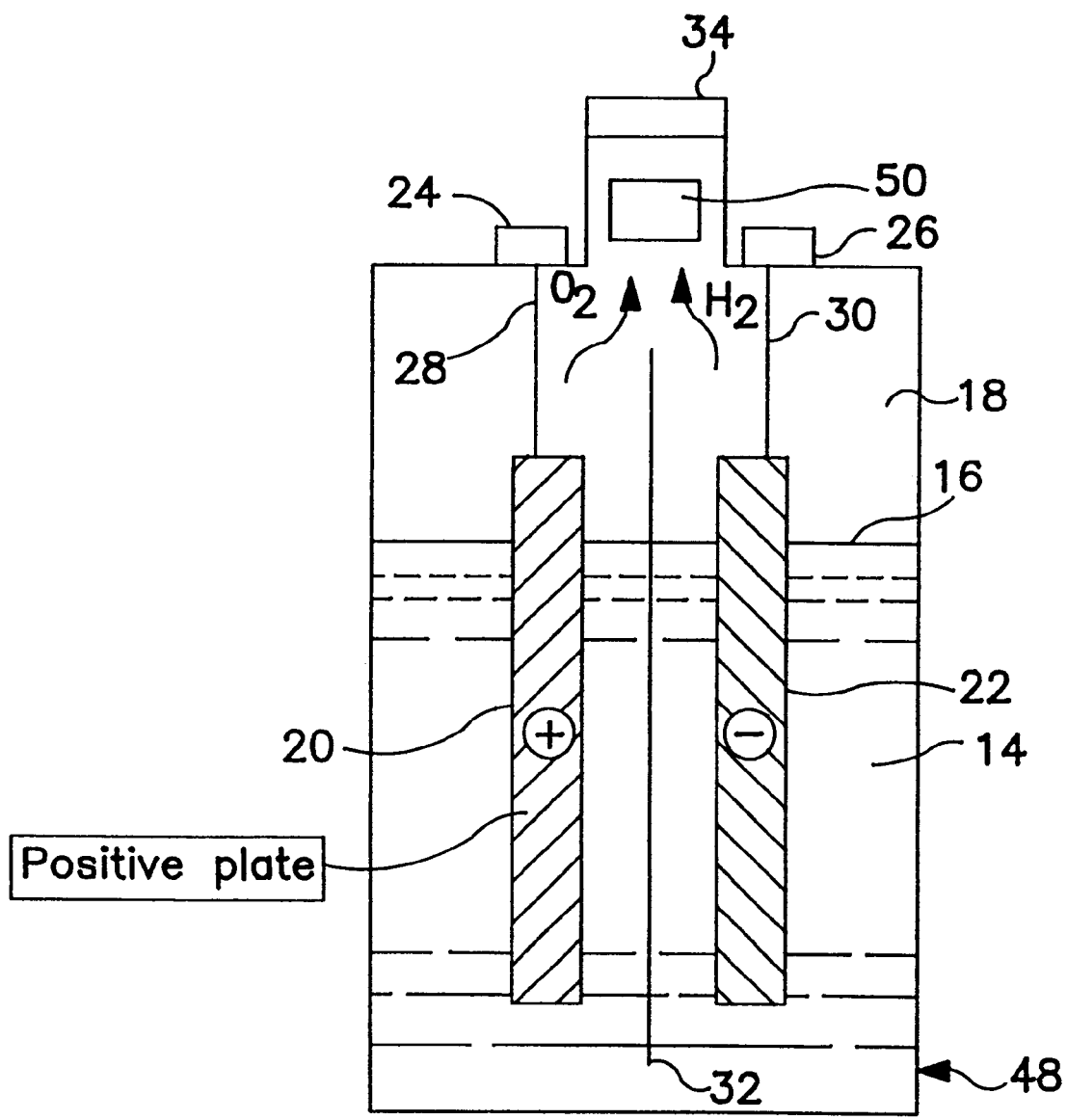
FIG. 7 is a schematic view of a battery cell similar to that shown in FIG. 3 and which includes a catalyst.

While oxygen generated at the positive plate can be recombined with hydrogen ions evolving at negative plate, the oxygen will not recombine with the hydrogen gas that is typically produced by the well-known self-discharge reaction of lead-acid cell. Further improvements can be realized by providing a catalyst. Illustrated in FIG. 7 is a battery cell 48 of the present invention having a semi-flooded design similar to that of FIG. 3. A catalyst 50 capable of recombining hydrogen and oxygen to water is in communication with the gas in the gas space 18. In the present embodiment the catalyst is positioned in the gas space 18. Any catalyst capable of combining hydrogen gas and oxygen gas to form water will suffice, for example palladium, platinum, and rhodium among the noble metals and tungsten carbide among the non-noble metals. An explosion limiting ceramic enclosure for the catalyst within the gas space 18 is preferable. The catalyst should be placed within or be accessible to the gas space 18, one preferred example combining the catalyst with the pressure relief valve 34 in the form of a removable plug.

Based on tests, the inventor believes that a catalyst device which can recombine hydrogen gas and oxygen gas will dramatically extend the life of VR cells in general and semi-flooded cells in particular. Many battery designers would consider catalysts to be redundant in VR cells since these cells are themselves "recombinant" cells. However, the term is misleading, because the VR cell only recombines oxygen gas with hydrogen ions and has no ability to recombine oxygen gas with hydrogen gas. A catalyst, on the other hand, recombines both gasses and it is this difference that makes it so beneficial.

The result of one test is exemplary: 5 VR cells with catalysts were compared with 5 standard but otherwise identical cells for gas emissions which, as has been explained, is related to water loss and, therefore, to service life. The test was run at a temperature of 90 degrees Fahrenheit and at charging voltages of 2.25 volts per cell; both are typical of normal service. Gas was collected from all the cells. The surprising results were as follows:

| | |
|---|---|
| Predicted life to failure, standard cells | 5 years |
| Predicted life to failure, catalyst cells | 25 years |

The reason for this very large improvement is fundamentally due to the ability of the catalyst to oxidize hydrogen gas. In conjunction with a semi-flooded cell construction, it provides a unique, novel and improved VR cell.

Figure 8:
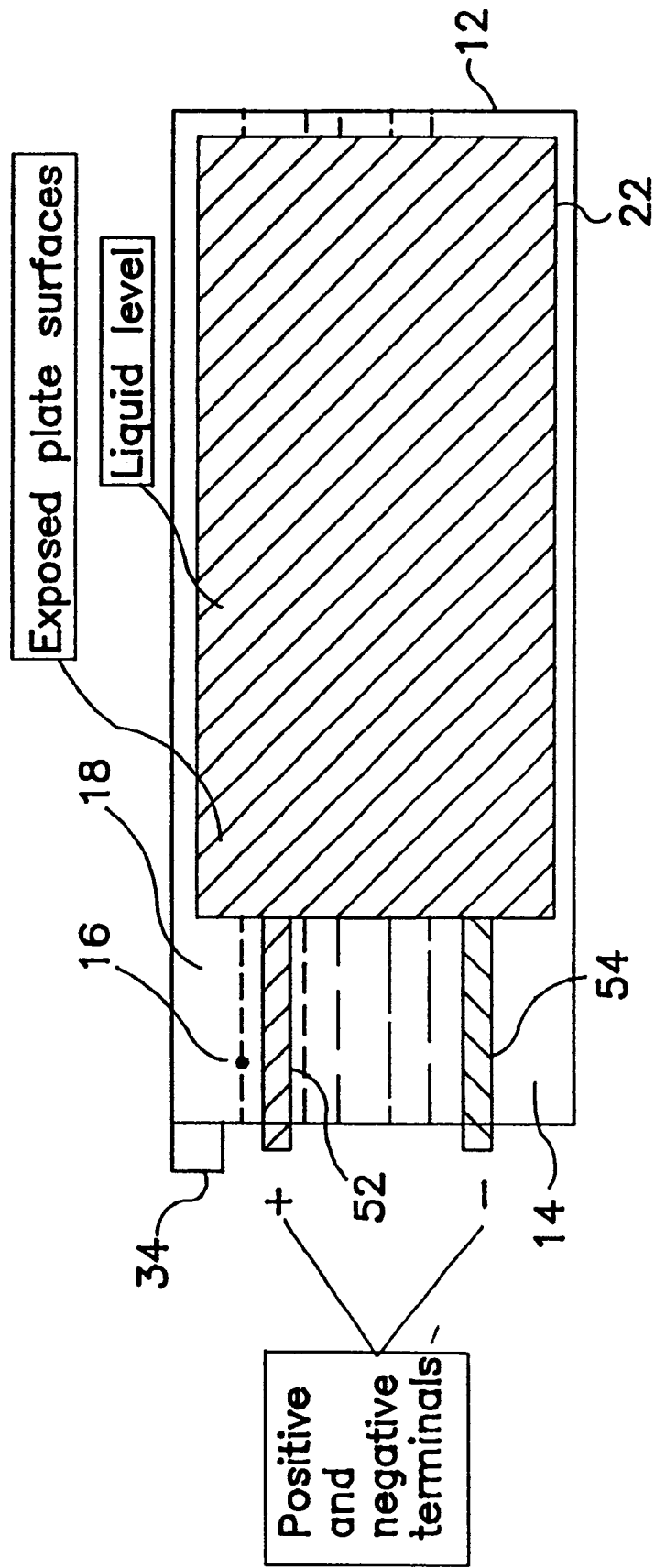
FIG. 8 is a schematic view of another embodiment of the present invention having the leads completely submerged in the electrolyte.

A further improvement is described with reference to FIG. 8 where both positive and negative straps (52 and 54 respectively) are immersed in the electrolyte. The negative strap 54 connecting the negative plate to the negative terminal outside the cell can corrode. Oxygen contacting the lead strap 54 combines with hydrogen ions on the moist surface of the lead strap 54 to form water. The water, being very pure, dissolves the lead strap 54. Thus, completely immersing the lead strap 54 in the electrolyte 14 as shown protects the lead strap 54 from corrosion.

Experimental Data

Tests were conducted to compare the performance of conventional storage batteries with those modified in accordance with the present invention. In one such test three lead-acid cells were connected in series so that they received the same current during charge. The cells were of the small Stationary variety with a nominal capacity of 36 ampere hours. The plates were made from a lead-calcium alloy. This is a typical alloy used in present battery designs in the U.S.A. for both flooded cells and VR cells; it is used expressly to minimize hydrogen generations.

Two of the cells were of conventional flooded cell design having a normal electrolyte level of a flooded cell. The third cell was identical except that it had a reduced electrolyte level, partially exposing the negative plate as discussed above for the semi-flooded cell of the present invention. The level of electrolyte was lowered to expose 7% of the negative plate height.

Pressure relief valves (one way valves) were provided in the venting system of all the cells to prevent air from entering the cells.

The three cells were placed in series and charged at a constant current of 24 mA. The voltage of the two unmodified cells were 2.37 and 2.41 volts respectively. The voltage of the modified, or semi-flooded cell, was 2.22 volts, showing a significant depolarization caused by the oxygen cycle.

Figure 9:
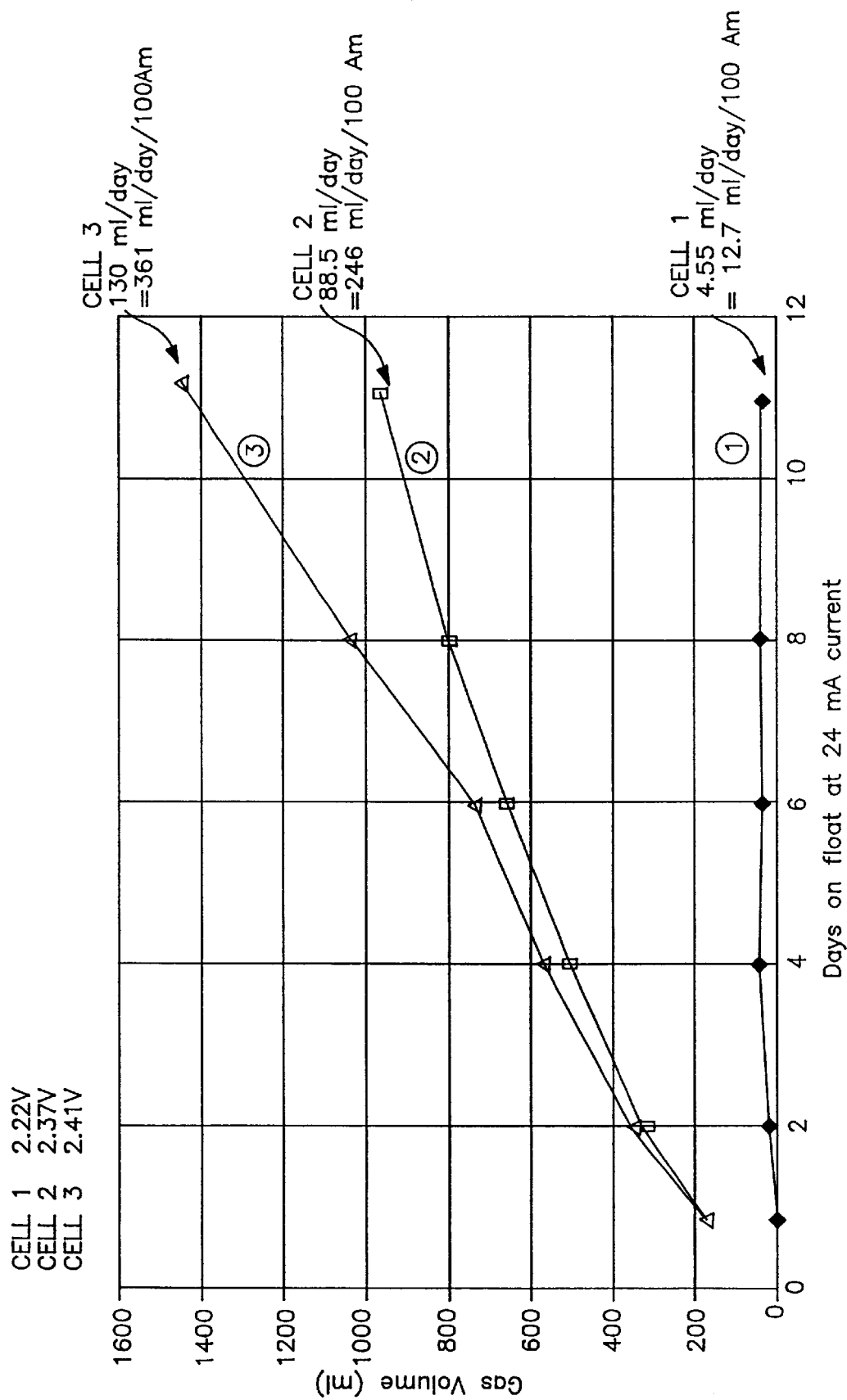
FIG. 9 is a graph of gas emissions versus time for two conventional cells and one semi-flooded cell made in accordance with the invention.

The cells were equipped with gas collection apparatus whereby the gas emissions from each cell were collected in inverted graduated cylinders placed in the bath of water. The gas was collected over a period of 12 days and the data plotted on a graph as shown in FIG. 9. Since gas emissions are related to water consumption, as is well known in the art, the lower the amount of gas emitted, the lower the water consumption of the cell.

By Faraday's law, each ampere hour of overcharge creates about 700 cc of hydrogen plus oxygen gas at room temperature. Since each of the three test cells received the same overcharge of 0.56 ampere hours each day, they would be expected to have a theoretical maximum gassing rate of about 400 cc per day. In practice, the actual values are always less than the theoretical values due to the absorption of some of the oxygen by the negative plate even when submerged in acid.

As expected, the two unmodified cells gassed at a rate that was a significant portion of theoretical. The cell with the higher voltage gassed more than the cell with the lower voltage, again an expected result.

The quantity of gas emitted on a standardized measure of milliliters per day, per 100 ampere hours of cell capacity was as follows:

| | | |
|---|---|---|
| Semi-Flooded Cell #1 | = | 12.7 ml/day/100 ampere hours |
| Flooded Cell #2 | = | 246 ml/day/100 ampere hours |
| Flooded Cell #3 | = | 361 ml/day/100 ampere hours |

The semi-flooded cell, therefore, had gas emissions almost 28 times lower than the flooded cells, behaving in a way that is typical of the best VR cells of conventional design. The rate of gassing was, in all cases, stable and uniform over the 12-day test period. There is no question that the concept of the semi-flooded cell works very well.

In this test, the level of the electrolyte in the cell was lowered to expose 7% of the negative plate height. Typically, conventional VR cells are designed to have about 5% of their surfaces exposed by adjusting the saturation of their separators so this is in the same order of magnitude. For a lower charging current (or voltage), less plate may be exposed. Note that the optimum level drop will be different for plates of different aspect ratios: for the same percent of plate area exposed, a tall, narrow plate will need a greater reduction in level than a short, wide plate. In practice, the preferred degree of exposure of the negative plate depends on the characteristics desired of the cell and preferably can range from about 25% to about 25% of the area of the affected plates.

Even more encouraging—and surprising—was the discovery that the semi-flooded cell of the present invention performed even better than production VR cells of the conventional design. This is an important observation and deserves further explanation.

A conventional VR cell will inevitably consume water, albeit at a much lower rate than flooded cells. When about 10% of the available water in the cell has been consumed, the cell's electrical capacity is diminished to the point of failure and the cell is considered to be at the end of its useful life. On present lead-acid designs, the amount of water that can be lost is about 5 grams per year per 100 Ah of capacity.

By well known calculation methods, this water consumption may be transposed into an average gas (hydrogen) emission rate over the life of the cell. The calculation yields the result that present VR cell designs dare not lose more than about 20 ml per day per 100 Ah of gas or they will fail prematurely from dryout.

To check the actual performance of VR cells, six conventional VR cells made by major battery companies were tested where it was found that only one of these met this target rate. That is, 5 out of 6 cells would not achieve their design lives. The gassing of most of these cells was typically two or three times higher the allowable rate of 20 ml/day, signifying that their actual lives would be much shorter than their design life of 20 years.

By contrast, the semi-flooded cell of this invention emitted gas at a rate of only 12.7 ml/day/100 Ah, well below the allowable rate and consistent with a predicted life of about 30 years. This data shows that a semi-flooded cell will not only recombine satisfactorily, but that it will do so better than most conventional VR cells. The conclusion is that the semi-flooded cell is superior to a conventional VR cell in the prime requirement of low maintenance.

Other Benefits of the Semi-Flooded Cell

Immediate gassing stability. It is very significant that the low gassing rate of the semi-flooded cell was achieved immediately after the cell was placed on float; it did not take several months of stabilization as is routinely expected with conventional VR cells. This indicates that the cell will be less variable in operation than conventional VR cells. A side benefit to a battery user is safety, because the gas being emitted is mostly hydrogen and very explosive. If a conventional VR cell gasses excessively when it is new, it may cause explosion hazards in the battery room.

Less prone to thermal runaway. Another benefit is that the semi-flooded cell will draw less current than a regular VR cell, reducing cell temperature. It will therefore be less prone to thermal runaway whereby the cell gets in a vicious cycle of temperature rise causing increased current causing further temperature rise, etc., until the cell is destroyed. A lower temperature will also increase the life of the cell.

Better heat transfer. Another benefit of the semi-flooded cell over a conventional VR cell is that the heat transfer rate from the inside of the cell to the outside ambient is better. This is because the liquid electrolyte in the former makes better contact with the cell container than the sponge-like glass mat separators of the latter.

Easier inspection. A very important benefit of the semi-flooded cell over a conventional VR cell is that it can be inspected easily. Standby batteries are used for emergency backup for computers and telecommunication systems; battery failures are completely unacceptable and users need a method to estimate the state of health of the cells. In a conventional VR cell, neither the electrolyte level nor plate condition can be seen through the opaque walls of the cells and there is no satisfactory way yet available of checking the cells without doing expensive discharge tests. (Note: At the present time, very expensive automatic data logging equipment is being promoted for use with conventional VR cells to try and predict imminent cell failures). With the semi-flooded design, by contrast, the container may be made transparent, and all the tried and tested procedures developed for flooded cells will work with only minor modifications. The semi-flooded cell, being easier to inspect, will lead to improved system reliability.

Low pressure recombination. Another benefit is that the oxygen cycle is so efficient on the semi-flooded cell that it proceeds without any significant pressure inside the cell casing (that is, less than 0.5 psi). This is in contrast to conventional VR cell designs that may have pressure relief valves set anywhere from 1.5 psi to 10 psi. The benefit here is that the cell container does not have to be reinforced with steel as in the case of conventional VR cells, to prevent them from bulging. The semi-flooded cell may be, therefore, less expensive to manufacture and lighter weight than a conventional VR cell.

More electrolyte available. Unlike the restricted amount of electrolyte contained in the sponge-like separators of the conventional VR cell, the semi-flooded cell has potentially much more available electrolyte. For example, the plates may be placed in an oversized container deliberately to provide more water. In other words, the semi-flooded cell has, simultaneously, a larger reserve of water and a lower water consumption rate than a conventional VR cell.

Lower acid density. Further, in the case of lead-acid cells, because of the larger available water reservoir, the strength (density) of the acid may be lowered with yet more benefit to longevity. Therefore, the semi-flooded cell will have a longer predicted life than a conventional VR cell.

Acid Mixing. A further feature is the addition of a unique electrolyte mixing principle. Electrolyte mixing is critically important in a flooded or semi-flooded lead-acid system because the electrolyte takes part in the discharge reaction of the plates and requires mixing during recharge to prevent stratification.

When lead-acid batteries are discharged the acid takes full part in the chemical reactions and, as a result, reduces in density. Therefore, when these batteries are recharged, the acid must be mixed in some way or else it will stratify in to layers of increasing density toward the bottom of the cells. In traditional flooded cells, acid mixing is effected by the gas bubbles given off by the plates during charge. But these gas bubbles are caused by electrolysis and imply excessive water consumption so this technique cannot be used in VRLA cells without shortening their useful lives.

In the lead-acid AGM and gel cell, an attempt is made to immobilize the acid in the separators or the gel. Even in these cells, however, the issue of stratification presents a real danger, especially in deep cycle service such as fork lift trucks.

In the present invention, a new principle is believed to take effect. It is based on the observation that an efficient oxygen cycle in a VRLA cell charges the positive plates continuously but, essentially, does not charge the negative plates. The charging of the positive plates creates bubbles of oxygen, as in a flooded cell. But this oxygen does not have to leave the cell, rather it recombines on the exposed parts of the negative plates. This means that the bubbles can be used for mixing while they rise up to the surface of the acid, but then they can be made to "disappear" as they recombine on the negative exposed strip. In other words, the bubbles can mix the acid during charge without leaving the cell as consumed water but instead recombine back into water to go through the oxygen cycle once again. This feature has special importance for uses such as fork-lift batteries because they are already configured in tall, vertical cells which are particularly prone to stratification problems.

Adjustable level. A further advantage of a semi-flooded cell is that the electrolyte level can be changed to expose more or less area of the plates and thereby adjust the characteristics of the cell—particularly the recombination rate. This can be done in the factory before shipment or in the field. Therefore, a semi-flooded cell can be "customized"

for an application, a feature not available with the conventional VR cell.

Predictable aging pattern. The conventional VR cell has a very complicated pattern of water consumption—one almost impossible to control. For example, the water consumption may be high in one zone of the sponge-like separators and not in another, causing random dry spots; it may be affected by the compression of the separator (since compression affects pore size); it may be drawn from the separator into the plates (due to the latter's smaller pore size) and affect the cell capacity.

The semi-flooded cell consumes water in a much more predictable way—the level simply drops like in a flooded cell (but much slower). All the plate surfaces below the electrolyte are flooded uniformly with electrolyte, independently of compression or pore size or type of separator. Further, it is easy to calculate this drop in level and, therefore, easy to predict cell life. For our test cell, we calculated that the electrolyte will drop less than 7% of the height of the negative plate in 20 years on float. Since the cell is normally expected to lose 20% of its capacity in that time, limited by the positive plate, this is a very acceptable figure. Further, with more development, we believe the 7% figure can be made considerably less. In any case, if full negative capacity were required for the entire life of the cell, the initial negative capacity could easily be increased by 7% to compensate.

Simplified emergency water addition. If a VR cell develops a leak—a very common failure—it will dry out. If water can be added, the cell can recover. The problem with a conventional VR cell is that there is no visible level so the amount of water to be added cannot be easily estimated. In the case of the semi-flooded cell, the level is visible and the exact amount of water to be added can easily be seen.

Change in Charging Voltage Preferred

If a flooded cell is converted to a semi-flooded cell, it is best to lower the charging voltage in order to obtain maximum cell life. A typical telephone flooded cell (lead-acid) is charged with an "overvoltage" of about 100 mV. Typically this is split between the positive and negative plates so they each get about 50 mV.

In the case of the semi-flooded cell, the negative is "depolarized" by the oxygen cycle so there is little or no voltage on the negative during normal operation. Therefore, if the same charging voltage intended for flooded cells is used, the positive plate will get the entire 100 mV overvoltage. This will increase the corrosion rate of the positive plate somewhat to the detriment of the life of the cell.

Accordingly, the float voltage on a semi-flooded cell should preferably be reduced by some amount depending on the application and the cell design. For longest life (minimum positive grid corrosion) the positive voltage should be kept in the range 30 to 70 mV.

It is understood that the foregoing description is intended to describe certain embodiments of the present invention, and is not intended to limit it in any way. The invention is to be read as limited by its claims only.

What is claimed is:

1. A lead acid battery, comprising:
   a sealed housing;
   a positive electrode comprising $PbO_2$ active material;
   a negative electrode comprising lead active material;
   a liquid electrolyte within said sealed housing in contact with said positive and negative electrodes, said electrolyte comprising sulfuric acid and having a liquid levels;
   a gas space within said housing in which oxygen gas collects, said gas space having a bottom defined by said liquid level, a portion of said negative electrode being exposed in said gas space above said liquid level to thereby expose a portion of the lead active material to said gas space; and
   a pressure relief valve disposed in said battery in communication with said gas space to allow gas to escape said sealed housing while preventing oxygen from outside the housing to contact said negative electrode.

2. A lead-acid electric battery in accordance to claim 1, wherein said positive electrode is completely submerged in said electrolyte.

3. A lead-acid battery in accordance with claim 1 wherein said negative electrode comprises a plate comprising said lead active material, said plate having a plate-section comprising a portion of said lead active material, said plate-section extending above the liquid level.

4. A lead-acid battery in accordance with claim 3 wherein said plate-section is an integral part of said plate.

5. A lead-acid battery in accordance with claim 1 wherein between about 0.25 percent and about 25 percent of the active material of the negative electrode is exposed in said gas space.

6. A lead-acid battery in accordance with claim 1 further comprising a negative strap connecting said negative electrode to a negative terminal disposed outside said housing, wherein said strap is submerged in said electrolyte.

7. A lead-acid battery in accordance with claim 1 further comprising a catalyst for recombining oxygen gas and hydrogen gas to form water, said catalyst being in communication with said gas space.

8. A lead-acid battery in accordance with claim 7 wherein between about 0.25 percent and about 25 percent of the active material of the negative plate is exposed in said gas space.

9. A lead-acid battery in accordance with claim 7 wherein said catalyst is selected from the group consisting of palladium, platinum, rhodium and tungsten carbide.

10. A lead-acid battery in accordance with claim 7 wherein said catalyst is combined with said pressure relief valve.

11. A lead-acid battery in accordance with claim 7 further comprising a separator disposed between said negative and positive electrodes.

12. A lead-acid battery in accordance with claim 11 wherein said separator comprises an absorptive separator made of a week wick material and having a section partially immersed in said electrollyte and another section in contact with said active material of said negative electrode above said liquid level.

13. A lead-acid battery in accordance with claim 12 wherein said sponge-like separator comprises glass fibers having a thickness of at least 10 microns.

14. A lead-acid storage battery, comprising:
   a sealed housing;
   a positive electrode comprising $PbO_2$ active material;
   a negative electrode comprising lead active material;
   a fluid electrolyte comprising sulfuric acid within said housing and in contact with said positive and negative electrodes;
   a gas space disposed within said housing wherein oxygen gas produced within the battery collects, and in which a portion of said negative electrode is exposed to said oxygen gas as it collects in said gas space;
   a catalyst for combining oxygen gas and hydrogen gas to form water, said catalyst positioned to be in communication with said gas space; and a pressure relief valve disposed in said housing to allow excess gas to escape from said housing.

15. A lead-acid storage battery in accordance with claim 14 wherein said positive and negative electrodes comprise one or more alternating positive and negative plates.

16. A lead-acid storage battery in accordance with claim 15 wherein between about 0.25 percent and about 25 percent of the active material of the negative plate is exposed to oxygen gas in the gas space.

17. A lead-acid storage battery in accordance with claim 15 further comprising a separator disposed between said negative and positive plates.

18. A lead-acid storage battery in accordance with claim 17 wherein said separator comprises an absorptive separator having a section partially immersed in said electrolyte and another section in contact with said active material of said negative plate above said liquid level.

19. A lead-acid storage battery in accordance with claim 14 wherein between about 0.25 percent and about 25 percent of the active material of the negative electrode is exposed to oxygen gas in the gas space.

20. A method of reducing water consumption in a lead-acid storage battery having a sealed housing in which a negative electrode comprising lead as the active material and a positive electrode comprising $PbO_2$ as the active material are in contact with an electrolyte comprising sulfuric acid; said method comprising:

(a) collecting oxygen gas produced within the battery in a gas space wherein said housing;

(b) exposing a portion of the active material of said negative electrode to the oxygen gas collected within said gas space wherein at least a potion of said oxygen gas reacts with hydrogen ions to form water;

(c) venting excess gas from said sealed housing; and (d) preventing gas outside said sealed housing from entering said sealed housing.

21. The method of claim 20 further comprising the step of (e) exposing a catalyst to said gas collected in said gas space, said catalyst capable of combining oxygen gas and hydrogen gas to from water.

22. The method of claim 21 wherein steps (c) and (d) are carried out by a pressure relief valve, and the catalyst of step (e) is positioned within said pressure relief valve.

23. The method of claim 20 wherein said electrolyte is liquid electrolyte.

* * * * *